Aug. 16, 1949.  J. F. EMERSON  2,479,105
TELEMETRIC MOTOR CONTROL SYSTEM
Filed Jan. 30, 1948
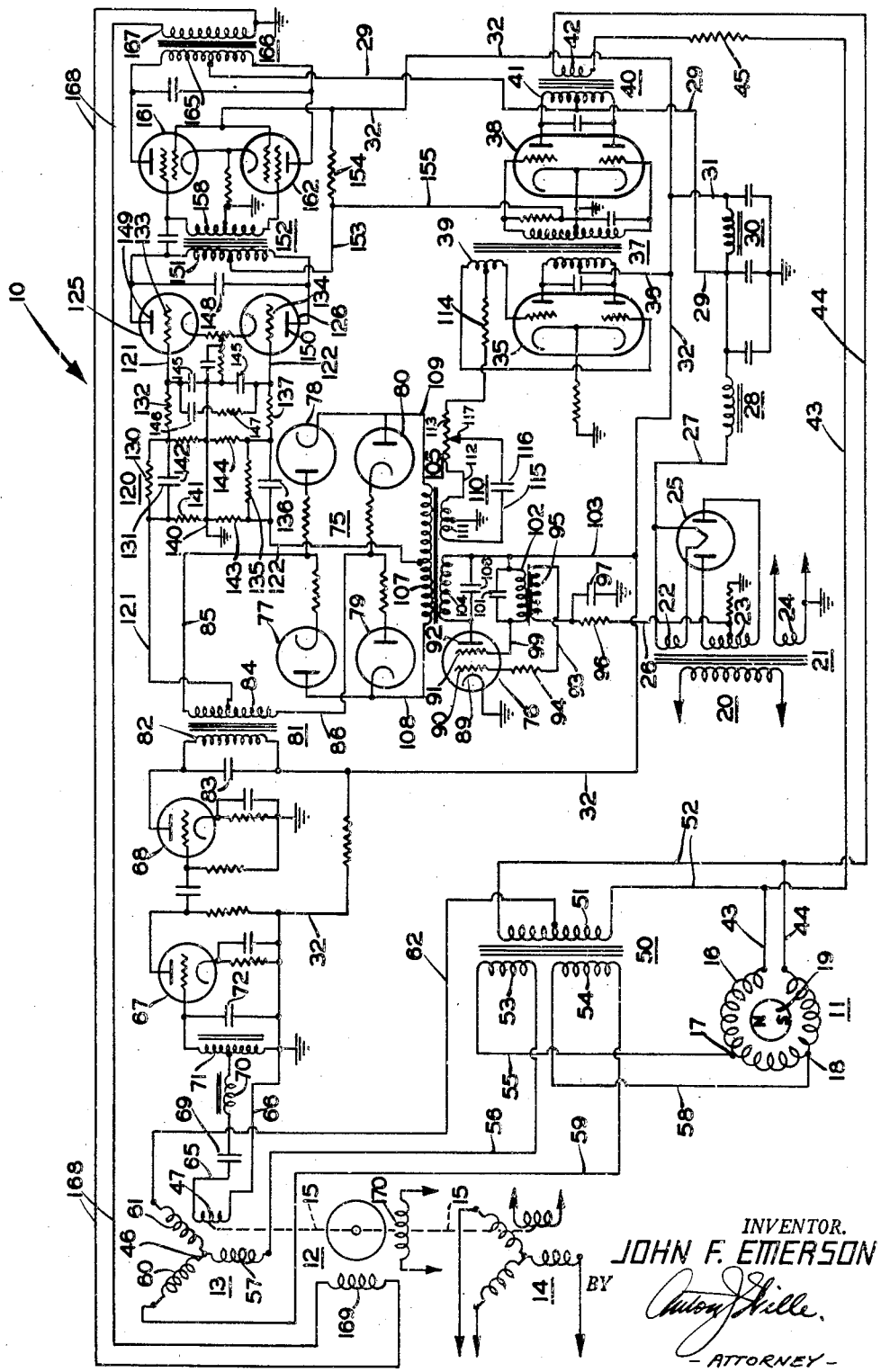
INVENTOR.
JOHN F. EMERSON
BY
Anton J. Hille
— ATTORNEY —

Patented Aug. 16, 1949

2,479,105

UNITED STATES PATENT OFFICE 2,479,105

TELEMETRIC MOTOR CONTROL SYSTEM

John F. Emerson, Hasbrouck Heights, N. J., assignor to Bendix Aviation Corporation, Teterboro, N. J., a corporation of Delaware Application January 30, 1948, Serial No. 5,282

8 Claims. (Cl. 318—30)

This invention relates to telemetric systems, and more particularly to a novel compass system by which any number of repeater indicators may be provided to indicate at a remote point the compass heading of a mobile craft.

An object of my present invention is to provide a novel telemetric system in which the transmitter and receiver of the system are of dissimilar nature, one being an electromagnetic device responsive to the position of a permanent magnet rotor, the other being an induction device, responsive to alternating current.

Another object of my invention is to provide a telemetric system of the character indicated in which the frequency of the energizing voltage is eliminated and the second harmonic derived to operate the receiver unit.

Still another object of this invention is to provide a telemetric system of the character indicated with means for eliminating the out-of-phase components of the second harmonic signal voltages developed and inverting such error signals to D. C. signals.

A further object of this invention is to provide a telemetric system in which the D. C. signals modulate the fundamental power supplied to control the operation of a servo motor for positioning the receiver in the synchronous or null position determined by the transmitter.

Still a further object of my invention is to provide a telemetric system of the character indicated with means for providing a rate signal to reduce the tendency of the system to oscillate about the synchronous position.

Yet another object of this invention is to provide a telemetric system of the character indicated which is independent of the frequency changes in the supply voltage.

And another object of my present invention is to provide a telemetric system of the character indicated which shall consist of few moving parts, shall be comparatively inexpensive to manufacture, which shall be fast, positive and accurate in its operation, which shall have a large variety of application, and yet be practical and efficient to a high degree in use.

Other objects of this invention will in part be obvious, and in part hereinafter pointed out.

Referring now to the single figure of the drawing forming a part of this specification in which one of the various possible illustrative embodiments of this invention is shown as a schematic wiring diagram, the numeral 10 designates the novel compass control circuit interconnecting a Magnesyn compass element 11 and a two phase servomotor 12, the servomotor positioning a synchro receiver 13 and a repeater transmitter 14 through suitable coupling or gearing herein designated by the dashed lines 15.

The compass element 11 comprises a stator winding 16 wound about a laminated ring core (not shown) of highly permeable magnetic material. The single coil of the stator winding is preferably provided with two tap-off points 17 and 18, spaced from the ends of the coil and from each other approximately one hundred and twenty degrees (120°). Concentric with the stator winding and in inductive relation therewith is a permanent magnet rotor 19, one half of which may be considered as a north pole, the other half, a south pole.

The stator winding 16 of the compass is energized indirectly from a power source 20. The power source 20 may be of any particular frequency, but in the description herein given, it will be assumed to be sixty (60) cycles. The power source 20 is connected to the primary winding of a transformer 21 having three secondary windings 22, 23, and 24. The secondary winding 24 supplies the necessary filament voltage for all of the vacuum tubes hereinafter enumerated, while secondary windings 22 and 23, the latter being provided with the usual grounded center-tap, are connected to the full wave rectifier tube 25. The output of said rectifier through the leads 26 and 27 is applied to the circuits of the vacuum tubes to be described. The positive lead 27 is connected through a filter circuit 28 to a lead 29; and through a second section 30 to a lead 31 which is connected to another lead 32 forming a common B+ supply lead for most of the vacuum tubes, as hereinafter appearing.

A tuned plate oscillator 35 is provided having its plate circuit connected to the B+ lead 32 by a lead 36 and whose output is connected through a coupling transformer 37 to a push-pull power amplifier stage 38. The transformer 37 is provided with a center tapped tickler coil 39 connected to the grids of the oscillator 35. Suitable locking voltage is applied by way of the center-tap on the coil 39 in the manner hereinafter described. The amplifier stage 38 provides the necessary power at the required frequency through a transformer 40 having a tuned primary 41 and a secondary winding 42 connected by leads 43, 44 through a resistor 45 to the stator coil 16 of the compass 11. The stator coil is thus energized to set up a reversing magnetic field which reacts with the unidirectional field of the permanent magnet rotor 19.

The synchro receiver 13 is to reproduce the angular displacement of the compass rotor 19 to indicate at a remote point the compass heading. The synchro receiver 13 comprises a three phase stator winding 46 and a single phase rotor winding 47 adapted to be rotated through the gearing 15 upon operation of the servomotor 12. It will be appreciated that the two units are of dissimilar type, the compass 11 being an electromagnetic device responsive to unidirectional magnetic fields; while the receiver is of the inductive type responsive to alternating current. The compass 11 is provided with a single winding having an energizing current flowing therein of a fundamental frequency. The periodically varying flux produced by the current through the stator winding 16 reacts with the unidirectional flux of the permanent magnet rotor 19 so that at one instant the rotor magnetizing force aids the stator magnetizing force in one half of the rotor core, and opposes it in the other half of the core. At the next instant, the aiding and opposing relations are reversed so that a second harmonic voltage is generated through the non-linear characteristic of the core, in the compass stator winding 16. The stator winding 16 will thus have a current of the frequency developed by the oscillator 35 flowing therein, as well as the second harmonics induced in each of the three sections or parts of the stator coil between the ends and tap-off connections 17 and 18.

Since the angular displacement of the rotor results in a change in the second harmonics induced in the three sections of the stator winding 16, it is desirable to eliminate the fundamental frequency in coupling the compass to the synchro receiver 13.

To this end, there is provided a bucking transformer 50 as set forth in U. S. Patent No. 2,419,087 issued to Peterson, et al., on April 15, 1947. The transformer 50 is provided with a center-tapped primary winding 51 connected by leads 52 across the power leads 43, 44, and two secondary windings 53 and 54. The secondary windings are wound in opposition. One end of secondary winding 53 is connected by a lead 55 to the tap-off point 17 on stator winding 16, and at the other end by a lead 56 to a phase 57 of the receiver stator 46. The secondary winding 54 is similarly connected by a lead 58 to the tap-off point 18, and by a lead 59 to a second phase 60 of the receiver stator. The third phase 61 of the receiver stator is connected by a lead 62 to the center tap of the primary winding 51.

Since the stator phase 61 is connected to the center tap of the primary winding 51, the voltage across this phase will be one-half the voltage across the power leads. By transformer action, one sixth of the voltage is induced in each of the secondary windings 53, 54. The sum of the voltages in the secondary windings and in their corresponding sections of the compass stator winding will be impressed across the receiver stator phases 57 and 60, and will equal one half of the voltage appearing across the power leads.

Thus, the fundamental frequency of the energizing voltage is eliminated, allowing only the second harmonics to act upon the synchro receiver 13. A displacement of the compass rotor 19 then, will provide a second harmonic displacement signal voltage which is impressed on the three phase stator 46 of the receiver 13. The rotor 47 when in positional disagreement with the compass rotor will have induced therein an error signal voltage which controls the operation of the servomotor 12 to reposition the receiver rotor 47 into the synchronous or null position with the compass rotor.

As previously indicated, the frequency of the power supply was assumed to be 60 cycles. By the action of the oscillator circuit 35, a frequency of 437.5 cycles may be provided in the power leads 43, 44. The error voltage induced in the receiver rotor 47 is of the second harmonic, and will be assumed to be 975 cycles.

The receiver rotor 47 is connected by leads 65, 66 to the input of a two stage amplifier 67 and 68. The lead 65 is connected through a condenser 69, and a choke coil 70, thence to a tap on a choke coil 71 connected across the leads 65, 66 in parallel with a condenser 72 to the control grid of the amplifier 67. The elements 69, 70, 71 and 72 constitute a band pass filter to attenuate all but the second harmonics (975 C. P. S.), the frequency of the error voltage. The filter, however, will leave in an appreciable amount of out-of-phase components present due to imperfections in the transmitter 11 and synchro receiver 13.

For purposes hereinafter appearing, it is desirable to eliminate the out-of-phase components of the amplified error signals, and to invert the signals to D. C. signals.

To this end there is provided a discriminator network generally designated by the numeral 75, and an oscillator 76 supplying the power for the network. The discriminator network comprises four diodes, or half-wave rectifiers, 77, 78, 79, and 80 connected into a full wave bridge circuit. The amplified error signals are impressed across the bridge circuit by a transformer 81. The transformer comprises a primary winding 82 having a condenser 83 in parallel therewith to form a tuned circuit, connected across the output of stage 68; and a center-tapped secondary winding 84. The winding 84 is connected at one end by a lead 85 through current limiting resistors to the cathode and plate of the diodes 77 and 78, respectively; while the other end of the secondary is connected by a lead 86 through current limiting resistors to the plate and to the cathode of the diodes 79 and 80, respectively.

The oscillator 76 comprises a beam tube or pentode, the internal connections of which are not shown, having a grounded cathode 89, a control grid 90, a screen grid 91 and a plate 92. The grid 90 is connected by lead 93 to the negative lead 26 of the rectifier circuit 25 through a resistor 94, a tickler coil 95 and a resistor 96 having a by-pass condenser 97 in connection therewith. The screen grid is connected by a lead 99 through a resonant circuit having a condenser 101 and an inductance 102 in parallel; and by a lead 103 to the positive lead 32 of the rectifier circuit; the inductance 102 and tickler 95 being wound on a magnetic core. The plate 92 is connected to the positive lead 103 through the primary winding 104 of a transformer 105; a condenser 106 in parallel with the primary winding forming a tuned circuit at the required frequency. The secondary winding 107 of the transformer is connected at one end by a lead 108 to the plate and to the cathode of the diodes 77 and 79, respectively; while the other end is connected by a lead 109 to the cathode and to the plate of the diodes 78 and 80, respectively.

It will be apparent from the oscillator circuit described, that the tube 76 is arranged in an electron-coupled circuit in which the cathode, control grid, and screen grid are operated as a triode oscillator, the screen grid serving as the anode. The few electrons intercepted by the screen are sufficient to maintain the oscillations through the inductive coupling of the screen and grid circuits. The remaining electrons impinging on the plate 92 provide the power output flowing through the primary winding 104. An oscillator is thus provided having appreciable power output with high frequency stability.

The oscillator 76 described will be referred to as the basic frequency oscillator. The basic frequency for the control circuit 10 may be considered to be 975 cycles per second. The oscillator 35 described provides a frequency of half the basic frequency or 487.5 C. P. S. to energize the transmitter stator coil 16. As will become more apparent as this description progresses, the operation of the control circuit 10 is dependent upon the stability of the two oscillators described. The oscillator 35 must develop exactly one-half of the basic frequency.

To insure the generation of a basic frequency and one-half the basic frequency, the oscillator 35 is coupled to the oscillator 76 by a phase shift and lock-in circuit generally designated by the numeral 110.

The lock-in circuit comprises a tertiary coil 111 of the transformer 105, which is center-tapped to ground. One end of said coil is connected by a lead 112 through a variable resistor 113 and a second resistor 114 to the center tap of the tickler coil 39; while the other end is connected by a lead 115 through a condenser 116 to the variable tap 117 on the resistor 113. The voltage induced in the tertiary coil 111 supplies the necessary locking voltage for the oscillator 35, the phase relation between the two oscillators being adjusted by positioning the variable tap 117 on the resistor 113. Any moderate change in the basic frequency developed by the oscillator 76 will result in a corresponding change in the frequency developed by the oscillator 35 due to the lock-in circuit 110. The two frequencies thus generated are at all times an even multiple of each other and in proper phase relationship.

The out-of-phase components of the signal are eliminated by the discriminator circuit 75 described, and are applied as D. C. signals to a rate network generally designated by the numeral 120. The rectified signals are applied to the rate circuit by the leads 121 and 122 connected to the center-taps of the secondary winding 84 and 107, respectively. It will be understood that the polarity of the rectified signal applied to the rate network 120 will be responsive to the phase of the original error signal developed; while the signal value will be responsive to the amplitude of the error signal.

The lead 121 is connected through the upper half of the rate circuit 120 to the input of a triode 125, while the lead 122 is connected through the lower half of the rate circuit to the input of a second triode 126. Both tubes are biased so that at a no error signal level, the plate currents of both tubes are equal, as hereinafter more fully described.

The lead 121 is connected through a resistor 130, a condenser 131 in parallel therewith, and a resistor 132 to the control grid 133 of the triode 125. The lead 122 is similarly connected to the control grid 134 of the triode 126 through a resistor 135, a shunting condenser 136 and a resistor 137. The cathodes 138 and 139 of tubes 125, 126 are connected to a common grounded lead 140 through the usual bias resistor and by-pass condenser. Resistors 141 and 142 are connected across the input leads 121, 140; while resistors 143 and 144 are connected across the input leads 140, 122.

When an error signal is present, the D. C. signal output of the discriminator network 75 will apply a voltage across the resistor 141 to ground, and across resistor 143 to ground. The polarity of the rectified signal applied will increase the bias of one of the triodes 125 or 126, and decrease the bias of the other. The change in bias will cause unequal plate currents to flow to operate the servomotor 15, in the manner to be described. A continued signal will drive the motor 12 into the null or synchronous position determined by the compass rotor 19 and the receiver rotor 57. Due to the inertia of the system, the motor 12 will have a tendency to overshoot this position causing a reversal of the cycle and resulting in the hunting of the motor.

A changing error signal will cause a current to flow through the condensers 131, 136. The condensers will be charged and set up a voltage in opposition to the error signal voltage. A decreasing signal will reduce the voltage drops across the resistors 142, 144. The counter voltage thus developed exists as long as the signal voltage decreases. The output of the triodes 125, 126 is thus reduced, to reduce the speed of the servomotor 12 faster than it would be by the error signal.

The output of the discriminator 75 contains a ripple component which is reduced by the by-pass condensers 145 connected between grid leads 121, 122 and grounded lead 140. Additional filtering is provided by condenser 146. A resistor 147 connected in series with this condenser minimizes phase lag of the signal component.

As previously described, the triodes 125, 126 are biased so that the plate resistances of the two sections are equal under no signal condition. The triode plates 149 and 150 are connected to either end of the primary winding 151 of a transformer 152. The winding 151 is shunted by a condenser 148 and the center-top thereof connected by a lead 153 through a resistor 154 to the B+ lead 32. The lead 153 is also connected by a lead 155 to a point across the secondary of the transformer 37 whereby the frequency generated by the oscillator 35 is superimposed on the B+ supply. An error signal causes the tubes 125, 126 to have unequal plate resistances thereby causing voltage from oscillator 35 to be induced into secondary 158.

It will be evident, that the plate currents of the triodes 125 and 126 flowing through the primary winding 151 of the transformer will cancel each other when no rectified signal voltages are impressed on the control grids 133 and 134. A change in the grid voltage of either of the triodes will provide an unbalanced condition, inducing in the secondary winding 158 a voltage of half the basic frequency, with amplitude and polarity controlled by the error signal. This voltage is amplified by the push-pull stage 161, 162 and applied across the primary winding 165 of a transformer 166. The primary winding 165 is center-tapped and connected to the B+ supply lead 29, while the secondary winding 167 is connected by leads 168 to variable phase 169 of the servomotor 12. The fixed phase 170 of the motor is energized from the secondary winding 42 of the half basic frequency oscillator circuit. Thus the fixed phase and variable phase of the servomotor are provided with voltages of the same frequency, the voltages being made in quadrature by the condenser and resistor across the secondary of transformer 37 in the same manner as the adjustable phase shifter of circuit 110.

In operation, therefore, the compass stator winding 16 is energized by a voltage source having a frequency of one-half the basic frequency of the control circuit. The magnetic reaction of the unidirectional field of the permanent magnet rotor 19 of the compass will induce second harmonics in the stator coil. The stator 46 of synchro receiver 13 is connected to the compass stator through a bucking transformer 50 which eliminates the energizing frequency and permits the second harmonics to be impressed on the windings of the receiver rotor. When the receiver rotor 47 is in the synchronous or null position as determined by the position of the compass rotor, no error signal voltage will be induced in the rotor.

A displacement of the compass rotor 19 upon a change in heading will induce in the three sections of the stator winding 16 a displacement signal which is impressed through the bucking transformer 50 on the windings of the receiver stator 46. The receiver rotor 47 will have induced therein an error voltage, the phase of which is dependent upon the direction of rotor displacement, and its amplitude dependent upon the extent of displacement.

The error signal thus induced is fed through a band pass filter to attenuate all frequencies but the desired second harmonics and then amplified by the two stages 67 and 68. A discriminator network 75 powered by the basic frequency oscillator 76 rectifies only the component of the complex wave from transformer 81 that is in phase with or 180 degrees out of phase with and of the same frequency as the voltage across the secondary 107. The rectified signals are then passed through a rate network and modified thereby to add a rate of change of error component to prevent oscillation of the servomotor.

The D. C. signals are thus impressed on the grids of triodes 125 and 126 to modulate the half basic frequency applied thereto by the oscillator 35. The signals now of the desired frequency are amplified by the push-pull circuit 161, 162 and applied to the variable phase of the servomotor 12. The motor 12 will be operated to position the receiver rotor 47 into the synchronous position determined by the compass rotor, at the same time positioning the rotor of the synchro repeater 14 to provide a signal means to indicate at other remote installations the compass heading, or operate other mechanisms in response to such signals, as for example, an automatic pilot system.

While the above description has been limited to a compass system, it will be apparent that a telemetric system has been provided in which the positioning of the rotor 19 will control the positioning of a remotely installed object by the operation of the servo-motor 12 in response to the displacement signals induced. The frequencies enumerated above have been given by way of example only; other frequencies may be found desirable. The two frequencies must be tied in and locked to each other to provide at all times a basic frequency and a dependent frequency.

It will thus be seen that a novel telemetric system has been provided in which the several objects of this invention are achieved, and which is well adapted to meet the conditions of practical use.

As various possible embodiments of the above invention might be made, and as various changes might be made in the embodiment set forth above, it will be understood that all matter herein set forth, or shown in the accompanying drawing, is to be interpreted as illustrative and not in a limiting sense.

Having thus described my invention, I claim as new and desire to secure by Letters Patent:

1. A telemetering system comprising a transmitter having a stator core, a winding thereon and a permanent magnet rotor, a source of periodically varying current of a basic frequency, a second source of periodically varying current locked to said first source and having a dependent frequency, said second source energizing the stator winding, the unidirectional field of said rotor inducing second harmonics in said stator winding, a receiver having a wound stator and a wound rotor, a servomotor to position said rotor, a bucking transformer interconnecting said transmitter and receiver permitting the induced second harmonics to energize the receiver stator to induce in said receiver rotor an error signal voltage dependent upon the relative positions of the receiver and transmitter rotors, means for rectifying the error signal voltages, means for modulating the dependent frequency current by said signals and apply the modulated current to said servomotor to drive the receiver rotor into positional agreement with transmitter rotor in response to the error signals.

2. A telemetering system comprising a transmitter having a stator core, a winding thereon and a permanent magnet rotor, a source of periodically varying current of a basic frequency, a second source of periodically varying current locked to said first source and having a dependent frequency, said second source energizing the stator winding, the unidirectional field of said rotor inducing second harmonics in said stator winding, a receiver having a wound stator and a wound rotor, a servomotor to position said rotor, a bucking transformer interconnecting said transmitter and receiver permitting the induced second harmonics to energize the receiver stator to induce in said receiver rotor an error signal voltage dependent upon the relative positions of the receiver and transmitter rotors, means for rectifying the error signal voltages, a derivative circuit for said rectified signal voltages to alter the signal voltages by a rate signal voltage, means for modulating the dependent frequency current by said signals and applying the modulated current to said servomotor to drive the receiver rotor into positional agreement with transmitter rotor without hunting about the synchronous position in response to the error signals.

3. A telemetering system comprising a transmitter having a stator core, a winding thereon and a permanent magnet rotor, a source of periodically varying current of a basic frequency, a second source of periodically varying current locked to said first source and having a dependent frequency, said second source energizing the stator winding, the unidirectional field of said rotor inducing second harmonics in said stator winding, a receiver having a wound stator and a wound rotor, a servomotor to position said rotor, a bucking transformer interconnecting said transmitter and receiver permitting the induced second harmonics to energize the receiver stator to induce in said receiver rotor an error signal voltage dependent upon the relative positions of the receiver and transmitter rotors, a band pass filter circuit for eliminating the undesired frequencies from said second harmonic signals, means for removing the out-of-phase components of said signals, means for rectifying the error signal voltages, a derivative circuit for said rectified signal voltages to alter the signal voltages by a rate signal voltage, means for modulating the dependent frequency current by said signals and applying modulated current to said servomotor to drive the receiver rotor into positional agreement with transmitter rotor without hunting about the synchronous position in response to the error signals.

4. A telemetering system comprising a transmitter having a stator core, a winding thereon and a permanent magnet rotor, a source of periodically varying current of a basic frequency, a second source of periodically varying current locked to said first source and having a dependent frequency, said second source energizing the stator winding, the unidirectional field of said rotor inducing second harmonics in said stator winding, a receiver having a wound stator and a wound rotor, a servomotor to position said rotor, a bucking transformer interconnecting said transmitter and receiver permitting the induced second harmonics to energize the receiver stator to induce in said receiver rotor an error signal voltage dependent upon the relative positions of the receiver and transmitter rotors, a full-wave bridge circuit powered by said source of basic frequency to eliminate the out-of-phase components of said second harmonic signals and inverting said signals to direct current; means for modulating the dependent frequency current by said rectified signals and apply the modulated current to said servomotor to drive the receiver rotor into positional agreement with transmitter rotor in response to the error signals.

5. A telemetering system comprising a transmitter having a stator core, a winding thereon and a permanent magnet rotor, a source of periodically varying current of a basic frequency, a second source of periodically varying current locked to said first source and having a dependent frequency, said second source energizing the stator winding, the unidirectional field of said rotor inducing second harmonics in said stator winding, a receiver having a wound stator and a wound rotor, a servomotor to position said rotor, a bucking transformer interconnecting said transmitter and receiver permitting the induced second harmonics to energize the receiver stator to induce in said receiver rotor an error signal voltage dependent upon the relative positions of the receiver and transmitter rotors, a full wave bridge circuit powered by said basic frequency source to eliminate the out-of-phase components of said second harmonic signals and inverting the same to direct current signals, a derivative circuit for said rectified signal voltages to alter the signal voltages by a rate signal voltage, means for modulating the dependent frequency current by said signals and applying the modulated current to said servomotor to drive the receiver rotor into positional agreement with transmitter rotor without hunting about the synchronous position in response to the error signals.

6. A telemetering system comprising a transmitter having a stator core, a winding thereon and a permanent magnet rotor, a source of periodically varying current of a basic frequency, a second source of periodically varying current locked to said first source and having a dependent frequency, said second source energizing the stator winding, the unidirectional field of said rotor inducing second harmonics in said stator winding, a receiver having a wound stator and a wound rotor, a servomotor to position said rotor, a bucking transformer interconnecting said transmitter and receiver permitting the induced second harmonics to energize the receiver stator to induce in said receiver rotor an error signal voltage dependent upon the relative positions of the receiver and transmitter rotors, a full wave bridge circuit powered by said basic frequency source to eliminate the out of phase components of said second harmonic signals and inverting the same to direct current signals, a derivative circuit for said rectified signal voltages to alter the signal voltages by a rate signal voltage, a filter for eliminating the ripple components of the signal and minimizing the phase lag thereof, means for modulating the dependent frequency current by said signals and applying the modulated current to said servomotor to drive the receiver rotor into positional agreement with transmitter rotor without hunting about the synchronous position in response to the error signals.

7. A telemetering system comprising a transmitter having a stator core, a winding thereon and a permanent magnet rotor, a source of periodically varying current of a basic frequency, a second source of periodically varying current locked to said first source and having a dependent frequency, said second source energizing the stator winding, the unidirectional field of said rotor inducing second harmonics in said stator winding, a receiver having a wound stator and a wound rotor, a servomotor to position said rotor, a bucking transformer interconnecting said transmitter and receiver permitting the induced second harmonic to energize the receiver stator to induce in said receiver rotor an error signal voltage dependent upon the relative positions of the receiver and transmitter rotors, a band pass filter circuit for eliminating the undersired frequencies from said second harmonic signals, means for removing the out-of-phase components of said signals, a full wave bridge circuit powered by said basic frequency source to eliminate the out-to-phase components of said second harmonic signals and inverting the same to direct current signals, a derivative circuit for said rectifier signal voltages to alter the signal voltages by a rate signal voltage, balanced modulator tubes powered by said dependent frequency source and receiving said signals for applying a signal modulated current to said servomotor to drive the receiver rotor into positional agreement with transmitter rotor without hunting about the synchronous position in response to the error signals.

8. A telemetering system comprising a transmitter having a stator core, a winding thereon and a permanent magnet rotor, a source of periodically varying current of a basic frequency, a second source of periodically varying current locked to said first source and having a dependent frequency, said second source energizing the stator winding, the unidirectional field of said rotor inducing second harmonics in said stator winding, a receiver having a wound stator and a wound rotor, a servomotor to position said rotor, a bucking transformer interconnecting said transmitter and receiver permitting the induced second harmonics to energize the receiver stator to induce in said receiver rotor an error signal voltage dependent upon the relative positions of the receiver and transmitter rotors, a band pass filter circuit for eliminating the undesired frequencies from said second harmonic signals, means for removing the out-of-phase components of said signal, a full wave bridge circuit powered by said basic frequency source to eliminate the out-of-phase components of said second harmonic signals and inverting the same to direct current signals, a derivative circuit for said rectified signals voltages to alter the signal voltages by a rate signal voltage, a filter for eliminating the ripple components of the signal and minimizing the phase lag thereof, balanced modulator tubes powered by said dependent frequency source and receiving said signals for applying a signal modulated current to said servomotor to drive the receiver rotor into positional agreement with transmitter rotor without hunting about the synchronous position in response to the error signals.

JOHN F. EMERSON.

REFERENCES CITED

The following references are of record in the file of this patent:

UNITED STATES PATENTS

| Number | Name | Date |
| --- | --- | --- |
| 2,409,970 | Agins | Oct. 22, 1946 |
| 2,419,087 | Peterson et al. | Apr. 15, 1947 |
| 2,424,568 | Isbister et al. | July 29, 1947 |